(12) United States Patent
Wiedenberg

(10) Patent No.: US 7,613,998 B2
(45) Date of Patent: Nov. 3, 2009

(54) METHOD FOR AUTOMATICALLY CREATING AT LEAST ONE DIALOG BOX ON AN OPERATOR INTERFACE OF A COMPUTER USER STATION

(75) Inventor: Peter Wiedenberg, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 10/773,433

(22) Filed: Feb. 9, 2004

(65) Prior Publication Data
US 2004/0261034 A1    Dec. 23, 2004

Related U.S. Application Data

(63) Continuation of application No. PCT/DE02/02764, filed on Jul. 26, 2002.

(30) Foreign Application Priority Data
Aug. 8, 2001    (DE)    ................. 101 38 920

(51) Int. Cl.
*G06F 3/00*    (2006.01)
*G06F 3/048*    (2006.01)
*G06F 17/00*    (2006.01)

(52) U.S. Cl. ............... 715/700; 715/809; 715/762; 700/90

(58) Field of Classification Search ............ 715/809, 715/764, 204, 700, 762; 707/102; 700/90
See application file for complete search history.

(56) References Cited

U.S. PATENT DOCUMENTS

| 5,261,043 | A | * | 11/1993 | Wolber et al. | ............... 715/809 |
|---|---|---|---|---|---|
| 5,377,318 | A | * | 12/1994 | Wolber | ............... 715/809 |
| 5,396,621 | A | * | 3/1995 | MacGregor et al. | ............ 715/809 |
| 5,784,633 | A | * | 7/1998 | Petty | ................. 710/60 |
| 5,966,532 | A |   | 10/1999 | McDonald et al. | |
| 6,091,415 | A | * | 7/2000 | Chang et al. | ............... 715/809 |
| 6,112,015 | A |   | 8/2000 | Planas et al. | |
| 6,834,388 | B1 | * | 12/2004 | Elsbree | ............... 719/316 |
| 2002/0156969 | A1 | * | 10/2002 | Tadokoro et al. | ............ 711/111 |

FOREIGN PATENT DOCUMENTS

WO    WO 99/46651 A1    9/1999

OTHER PUBLICATIONS

Marco Boehm, et al, "Visualisierungstools in Der Automation [Visualization Tools in Automation]", Elektronik Jun. 2000, pp. 76, 78, 80, 82, 84 and 86.

* cited by examiner

*Primary Examiner*—Ting Zhou
(74) *Attorney, Agent, or Firm*—Staas & Halsey LLP

(57) ABSTRACT

A method for automatically creating at least one dialog box on an operator interface of a computer user station, which is connected to an industrial process installation via at least one interface so as to transmit data (e.g., process data, status data, control and/or regulating data). The created dialog box displays the transmitted data of the process installation on the operator interface. Further, the data of the process installation that is to be displayed is assigned to certain, stored data types. The at least one dialog box is created on the operator interface of the computer user station so as to display the data to be graphically represented by means of display types (e.g., pointers, bars, numerical displays, etc.), which are assigned to the respective data types.

14 Claims, 1 Drawing Sheet

METHOD FOR AUTOMATICALLY CREATING AT LEAST ONE DIALOG BOX ON AN OPERATOR INTERFACE OF A COMPUTER USER STATION

This is a Continuation of International Application PCT/DE02/02764, with an international filing date of Jul. 26, 2002, which was published under PCT Article 21(2) in German, and the disclosure of which is incorporated into this application by reference.

FIELD OF AND BACKGROUND OF THE INVENTION

This invention relates to a method for automatically creating at least one dialog box on an operator interface of a computer user station. The computer user station is connected to an industrial process installation via at least one interface so as to transmit data (e.g., process data, status data, control and/or regulating data). Therein, the created dialog box displays the transmitted data of the process installation on the operator interface.

It is known from the related art that data (e.g., process data, status data, control and/or regulating data) of an industrial process installation can be displayed on an operator interface of a computer user station via so-called "operator modules." Individual, selected data of the respective industrial process installation is graphically displayed in a dialog box on the operator interface, which is individually created for the respective process data. Conventionally, such operator modules have been designed individually in a very time-consuming process, e.g., by using design systems for process display (such as Win CC).

OBJECTS OF THE INVENTION

It is one object of this invention to provide a time-saving and efficient method so as to automatically create at least one dialog box for displaying data of a process installation on the operator interface of a computer user station.

SUMMARY OF THE INVENTION

This and other objects of the invention are achieved by a method for automatically creating at least one dialog box on an operator interface of a computer user station, which first assigns process installation data to be displayed to certain, stored types of data. Then, at least one dialog box is created on the operator interface of the computer user station so as to display the data that is to be displayed by means of display types (e.g., pointers, bars, numeric displays, etc.), which are assigned to the respective data types. Hence, the user need no longer determine individually for each of the data how it is to be graphically displayed on the operator interface.

The method according to the invention makes it possible to automatically create the respective dialog boxes, in particular after selecting the process installation data to be displayed and after indicating the memory addresses of this data in the computer user station. This greatly shortens design time and prevents design errors.

According to an advantageous embodiment of the method, the automatically generated dialog box can be called up via a link identifier of a further (first) dialog box. Thus, at first, during operation of the respective process installation, only a first dialog box is called up on the operator interface, and the user can display the additional, automatically generated dialog box(es) on the operator interface via respective link identifiers in the first dialog box.

Advantageously, the first dialog box is saved in a graphic library that is stored in the computer user station, for example, and, therefore, the first dialog box need not be created by the user. Alternatively and/or additionally, the first dialog box may be created via a supporting graphics program, wherein individual graphic implementations or realizations may also be taken into account.

Another advantageous embodiment of the method according to the invention makes it possible to retrieve a complete or partial selection of the transmitted process installation data to be displayed on the operator interface of the computer user station.

Thus, the user can define whether additional dialog boxes are automatically created so as to display all data or only a limited number of data.

In order to automatically generate the graphic display of the selected data in the method according to the invention, stored assignments between the data types and the display types (e.g., pointers, bars, numeric display, etc.) are retrieved. Data types that can be differentiated include process data, status data, control and/or regulating data.

It is possible to stipulate that the "process data" data type (e.g., temperature) is assigned, for example, to the "numeric display" display type (e.g., display in ° C.). The assignments between the data types and the display types can be expanded or modified and can be adapted to the process installation or to user requirements. Therein, certain graphic user profiles may also be created.

Another exemplary embodiment of the method according to the invention permits changing the number and type of the display types and/or the data types so as to be able to adapt to changing user needs.

BRIEF DESCRIPTION OF THE DRAWINGS

Further details of this invention can be derived from the single drawing, which shows a flow chart of individual method steps for automatically generating a dialog box on an operator interface of a computer user station.

DETAILED DESCRIPTION OF THE PREFERRED EMBODIMENTS

Figure 1:
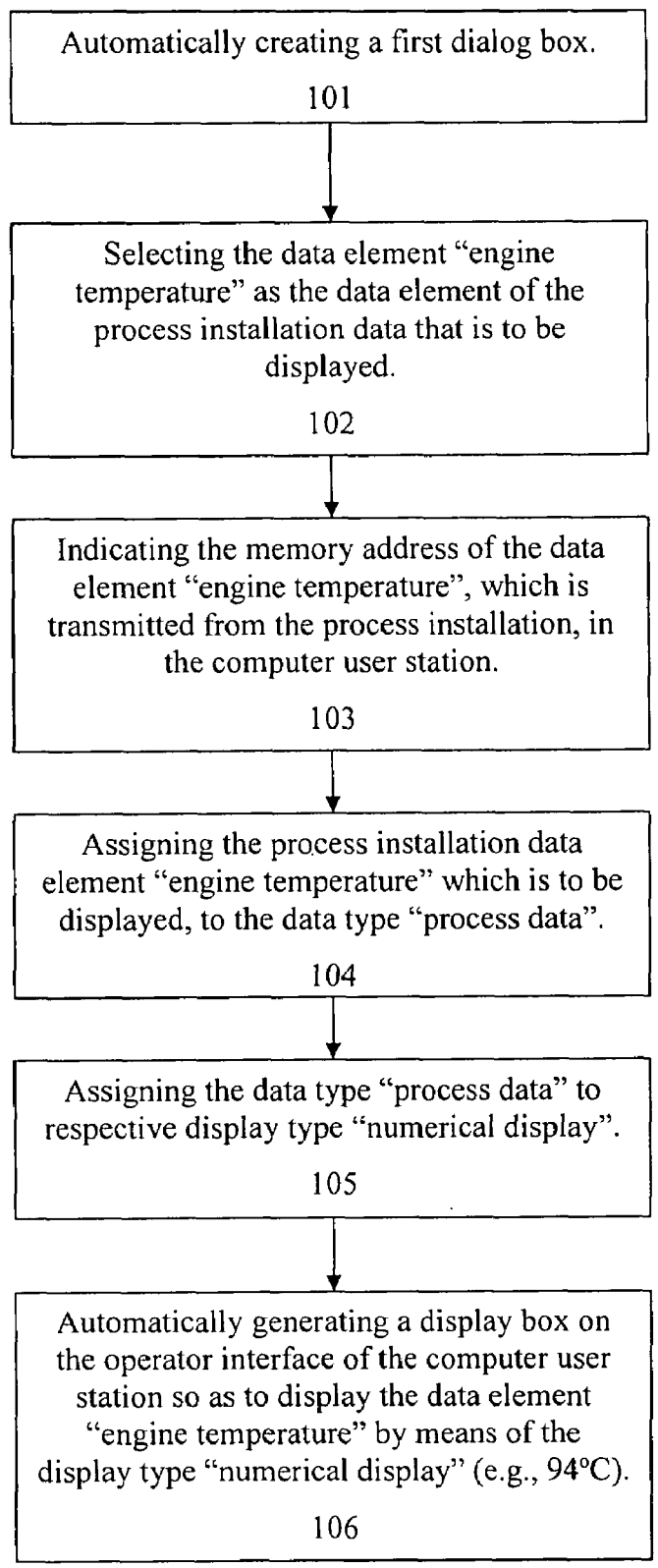

The exemplary embodiment illustrated in the single drawing shows how, in a process installation (e.g., interconnected machine tools with individual converter-fed engines), a dialog box for displaying the engine temperature of a converter-fed engine is created on the operator interface of a computer user station.

First, a dialog box is automatically created (operation 101). Second, as is known from conventional design methods, the user selects the data element "engine temperature", which is the data element to be displayed, from the data that is transmitted from the process installation to the computer user station (operation 102). Furthermore, the user indicates the memory address of the data element "engine temperature" in the computer user station, in particular (operation 103). This facilitates a call-up of the respectively current engine temperature, which is transmitted from the process installation, on the operator interface.

The computer user station is connected, in known manner, to the industrial process installation by at least one data line, so that, via the data connection, the respective data of interest is stored via interfaces at the respective memory addresses. Thus, this data of the industrial process installation is present in the computer user system and can be taken into account in the graphic display on the operator interface.

The operations 104, 105, and 106 take place in deviation from the related art. First, based on a predetermined assignment, the data element "engine temperature", which is to be displayed, is assigned to the data type "process data" (operation 104). Second, the data type "process data" is assigned to the respective display type "numerical display" (operation 105).

Finally, the display box for displaying the selected data element "engine temperature" is automatically generated, in that the display type "numeric display" is determined for the data element "engine temperature". This is due to the fact that, in accordance with an existing assignment (in particular, an assignment that can be modified), process data is displayed as a numeric display, e.g., as a current engine temperature: 94° C., in the created display box (operation 106).

In supporting manner, graphically adapted display forms, which are known per se (e.g., templates according to Windows standard), can be used in the respective display program that is used on the operator interface so as to display the created dialog box.

In accordance with the stored assignments between the data types and the display types, further dialog boxes may be automatically created for further selected data, which have access to the memory addresses of the selected data and which graphically display the data stored there for the industrial process installation.

Other dialog boxes are automatically created, which, after retrieving a first dialog box, can be retrieved by appropriate link identifiers in the first dialog box.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for automatically creating at least one display box on an operator interface of a computer user station, which is connected to an industrial process installation via at least one interface so as to transmit data, wherein the at least one display box displays the transmitted data of the industrial process installation on the operator interface, the method comprising:
    a) automatically generating a dialog box;
    b) selecting at least one data element to be displayed from the data that is transmitted from the industrial process installation in the dialog box;
    c) indicating a memory address of the data element; and
    d) assigning the transmitted data of the industrial process installation that is to be displayed to certain, stored data types; and
    e) automatically generating the at least one display box on the operator interface of the computer user station so as to display the data utilizing display types that are respectively assigned to the data types,
    wherein the data type is selected from the group consisting of process data, status data, control data and regulating data,
    wherein the data types define various types of data present in the industrial process installation, and
    wherein the transmitted data is categorized into one of the data types.

2. The method as claimed in claim 1,
    wherein the display types are selected from the group consisting of pointers, bars, and numeric displays.

3. The method as claimed in claim 1, wherein the display box is retrieved on the operator interface of the computer user station via a link identifier of a further display box.

4. The method as claimed in claim 3,
    wherein the further display box is assigned to a library stored in the computer user station.

5. The method as claimed in claim 3,
    wherein the further display box is created via a supporting graphics program.

6. The method as claimed in claim 1,
    wherein the transmitted data that is to be displayed is selected from the transmitted data of the process installation.

7. The method as claimed in claim 1, further comprising: modifying the assignment of the data types and the display types.

8. The method as claimed in claim 1, further comprising: modifying a number and a type of the display types.

9. The method as claimed in claim 1, further comprising: modifying a number and a type of the data types.

10. The method as claimed in claim 1, wherein the assignments between the data types and the display types are pre-stored in the computer user station.

11. The method as claimed in claim 1, further comprising a user modifying the pre-stored assignments between the data types and the display types.

12. The method as claimed in claim 1, wherein the industrial process installation comprises interconnected machine tools with individual converter-fed engines.

13. A method, comprising:
    assigning data, which are transmitted from a technical facility to a computer, to respective data types stored in the computer;
    assigning the data types to respective display types; and
    automatically generating at least one display box on a graphical user interface of the computer so as to display the data on the graphical user interface with the data types and the display types,
    wherein the data types are selected from the group consisting of process data, status data, control data and regulating data,
    wherein the data types define various types of data present in an industrial process installation, and
    wherein the transmitted data is categorized into one of the data types.

14. The method as claimed in claim 13, wherein the industrial process installation comprises interconnected machine tools with individual converter-fed engines.

* * * * *